Figure 1:
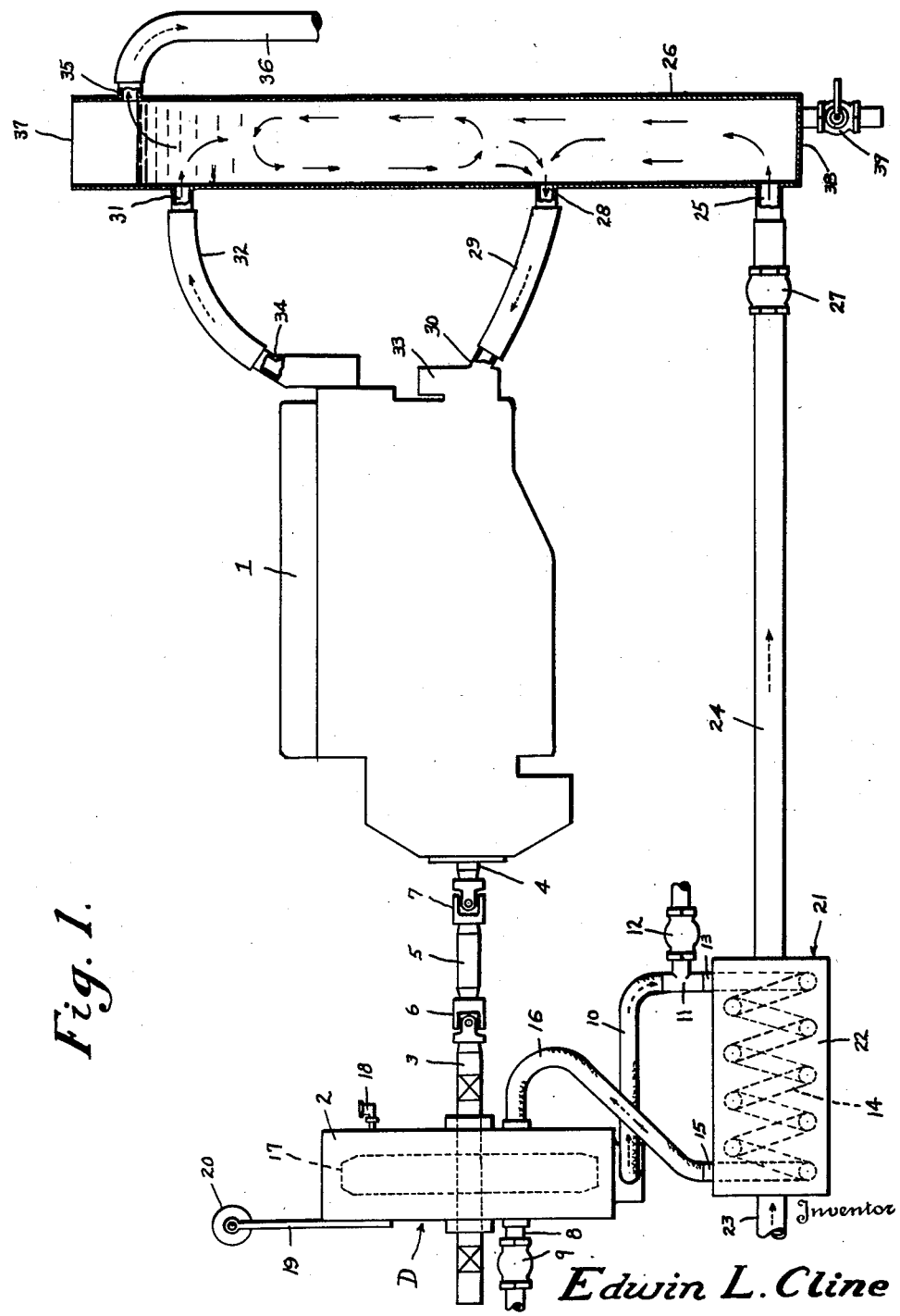

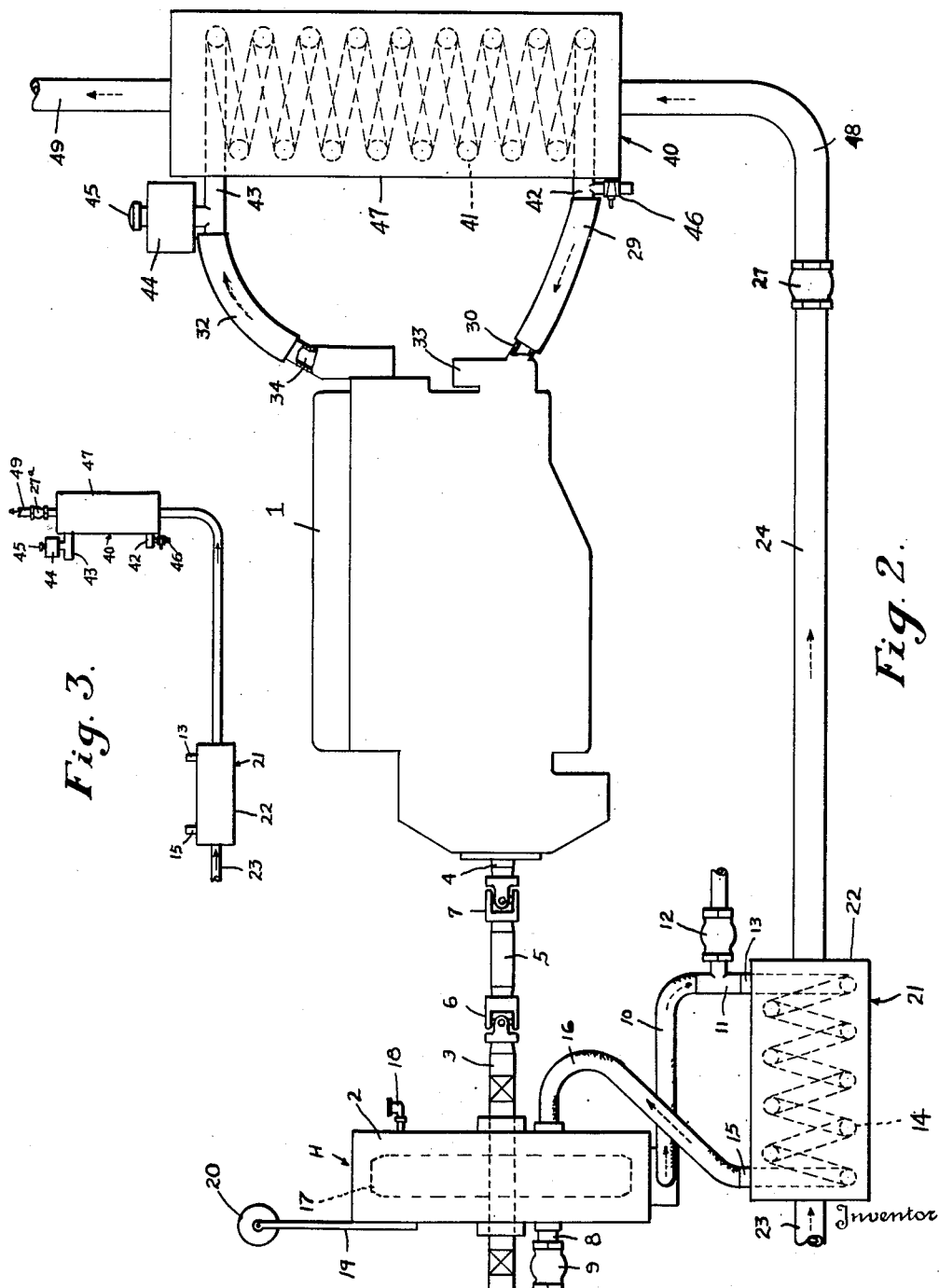

Patented May 20, 1952

2,597,450

UNITED STATES PATENT OFFICE 2,597,450

SERIES FLOW COOLING SYSTEM FOR DYNAMOMETERS AND ENGINES

Edwin L. Cline, Pasadena, Calif., assignor to Clayton Manufacturing Company, Alhambra, Calif., a corporation of California Application October 1, 1946, Serial No. 700,469

16 Claims. (Cl. 73—116)

The present invention relates to novel cooling systems for effecting cooling of any liquid-cooled power absorption device and for also effecting cooling of any liquid-cooled prime mover whose power is being absorbed by such power absorption device.

More specifically, the invention relates to a cooling system for effecting cooling of the brake liquid of a hydraulic dynamometer and for also effecting cooling of a liquid-cooled engine while being tested by said hydraulic dynamometer.

The invention further relates to an automatic cooling system for a hydraulic dynamometer, or other power absorption device, and an engine undergoing test wherein water consumption, corrosion and liming are reduced to a minimum, and the number of automatic temperature regulating devices is also reduced to a minimum.

The invention further relates to a hydraulic dynamometer, or other power absorption device, and an engine cooling system arranged so that the engine cooling-liquid can be maintained separate from the dynamometer cooling-liquid, or the cooling liquid of said other power absorption device, in order to eliminate waste or contamination thereof.

The principal object of the invention is to provide a cooling system which will serve the dual purpose of cooling a hydraulic dynamometer, or any liquid-cooled power absorption device, and cooling an engine while being subjected to various torque loads by said dynamometer or power absorption device.

Another object of the invention is to provide an improved cooling system for a power absorption device and liquid-cooled engine in which the volume of water or coolant employed for cooling purposes is maintained at a minimum; and in which corrosion, scaling or "liming" of the heat transfer surfaces is also maintained at a minimum.

Another object of the invention is to provide an improved cooling system for a power absorption device and liquid-cooled engine requiring a minimum of automatic temperature regulating devices.

Other objects and advantages of the invention will be apparent from the following description taken in conjunction with the accompanying drawings, in which:

Fig. 1 diagrammatically illustrates a hydraulic dynamometer, as an example of one form of power absorption device, and a liquid-cooled engine having a cooling system operatively associated therewith in accordance with the principles of the present invention;

Fig. 2 is a view similar to Fig. 1, but showing a modified system including two heat exchangers connected in series for respectively effecting cooling of the liquid of the power absorption device and the cooling-liquid of the engine; and Fig. 3 is a fragmentary diagrammatic view illustrating a modification of the cooling system shown in Fig. 2.

Referring to Fig. 1, the numeral 1 generally identifies a water or liquid-cooled type of internal combustion engine, said engine being adapted to be supported for test purposes upon any suitable stand, not shown. While any suitable power absorption device, such as a conventional hydraulic dynamometer, a water-jacketed hydraulic dynamometer, a water-cooled electric dynamometer, a water-cooled friction type of dynamometer, etc., may be arranged to absorb the power developed by the engine 1, a conventional hydraulic dynamometer D has been illustrated herein by way of example. The hydraulic dynamometer D includes a housing 2 adapted to contain a power absorption liquid, and a shaft 3 journaled in said housing. The shaft 3 is connected with a torque transmitting shaft 4 associated with the engine 1, by an intermediate shaft 5 and a pair of universal joints 6 and 7.

A conduit 8 is connected with a low pressure point of the housing 2 and has a loading valve 9 connected therein, which may be either manually operated, or electrically or otherwise controlled from a remote point, for admitting brake or power absorption liquid into said housing to vary the load imposed upon the engine 1. One end of a flexible discharge conduit 10 is connected with the housing 2 at the lower portion of said housing and its opposite end is connected with a fitting 11. An unloading valve 12 is connected with the fitting 11 and may be either manually operated, or electrically or otherwise controlled from a remote point, to effect a discharge of the liquid from the dynamometer D to reduce the load imposed by said dynamometer upon the engine 1. The fitting 11 is also connected with one end 13 of a copper heat exchange coil 14 and the opposite end 15 of said heat exchange coil is connected with a flexible return conduit 16 for returning cooled brake liquid to the dynamometer housing 2.

The dynamometer D includes a rotor 17 within the housing 2 and secured to the shaft 3, said rotor causing a forced circulation of the brake liquid through a closed circulating system provided by the conduit 10, heat exchange coil 14 and return conduit 16 when said shaft is driven by the engine 1, it being understood that a volume of liquid equal to that displaced from the housing 2 and forced into the conduit 10 is returned through the conduit 16 to said housing so that the volume of brake liquid in the dynamometer D can be maintained constant to impose any desired constant load upon the engine 1. An air-inlet check valve 18 is mounted upon the housing 2 to automatically admit air into said housing to prevent the creation of a vacuum condition therein as the volume of brake liquid in said housing is reduced upon opening of the unloading valve 12. Any suitable means, such as an arm 19 and a conventional torque indicating means 20, can be associated with the dynamometer D for measuring the engine torque absorbed thereby.

The coil 14 constitutes one element of a heat exchanger 21 and is enclosed in a casing 22 having the inlet end thereof connected with a conduit 23 for continually supplying water or other coolant to said casing for effecting cooling of said coil, and hence, cooling of the brake liquid circulating through said coil. A pipe 24 is connected with the outlet end of the casing 22 and conducts the coolant discharged from said casing to an inlet opening 25 at the lower end of an upright cooling tower or standpipe 26. A valve 27 is shown connected in the pipe 24 for controlling the rate of flow of coolant therethrough. The valve 27 is preferably a conventional automatic, thermally-responsive or thermostat-electrically controlled valve, which will automatically open and close in accordance with variations in the cooling requirements of the engine 1 to maintain said engine at any desired operating temperature. On the other hand, in certain installations, the valve 27 may be of a conventional manually operated type adapted to be adjusted to control the volume of coolant introduced into the tower or standpipe 26.

The standpipe 26 has a branch outlet providing a discharge opening 28, disposed above the inlet 25, and which is connected by a section of hose 29 to a cooling water inlet 30 associated with a conventional circulating pump 33. The standpipe 26 has a return branch arranged near the upper end thereof providing a return opening 31. The opening 31 is connected by a section of hose 32 with a cooling liquid outlet 34. The standpipe 26 also has an overflow outlet 35 located at a level above the return opening 31, and a drain hose 36 is connected with the overflow outlet 35 for conducting heated, excess liquid from the standpipe 26 to a suitable drain. The standpipe 26 is preferably open at its upper end 37 so that the liquid level therein can readily be ascertained by visual inspection. The standpipe 26 has a lower end wall 38 to which a conventional drain valve 39 is connected for completely draining said standpipe, whenever desired.

In the operation of the cooling system above-described, it will be apparent that the connections between the dynamometer D and the heat exchange coil 14 are permanent and need not be disturbed with any change in the engine to be tested. Hence, cooling water admitted into the heat exchanger 21 through the pipe 23 will effect cooling of the brake liquid circulating through the heating coil 14, and the thus partially heated cooling water will pass into the pipe 24 for delivery to the inlet opening 25 at the lower end of the cooling tower or standpipe 26. It will be further apparent that the hose sections 29 and 32 will be connected with the conventional water inlet and outlet 30 and 34, respectively, of any engine connected with the dynamometer D for test purposes, the cooling water then circulating within the engine between the inlet 30 and outlet 34, in a manner well understood, to effect cooling thereof.

Cooling of the engine 1 is effected with the present cooling system by the passage of comparatively cool water from the lower portion of the standpipe 26 into the hose section 29 through the standpipe discharge opening 28 for circulation through the engine 1 and for return through the hose section 32 and return opening 31 to a level in the standpipe 26 well above the point of connection of the hose 29 with said standpipe. The heated water thus returned from the engine 1 mingles with the water introduced by the pipe 24 which flows upwardly in the standpipe 26 so that a circulation or mixing occurs somewhat as indicated by the arrows. The valve 27 is preferably such that with normal engine operating temperatures the delivery of the cooling water through the pipe 24 to the standpipe 26 is continual, so that fresh cooling water is continually introduced into the lower end of the standpipe 26 for forced circulation through the engine 1 and a corresponding volume is continually discharged from the tower 26 through the overflow opening 35. The overflow opening 35 is located at a level slightly above the return opening 31 so that the hottest water, which is that returned from the engine to the standpipe 26, can overflow directly into the drain hose 36 without commingling to any great extent with the relatively cooler water remaining in the tower or standpipe 26.

The amount of heat absorption required to effect satisfactory cooling of the brake liquid by the heat exchanger 21 does not raise the temperature of the water discharged from said heat exchanger and introduced into the standpipe 26 to such an extent as to render it ineffective for adequately cooling the engine undergoing test. This will be apparent from the illustrative examples set forth hereinafter showing the gallons of water per minute necessary for various B. t. u. absorption requirements to respectively cool the dynamometer liquid and the engine.

Fig. 2 illustrates a dynamometer and engine cooling system similar to that shown in Fig. 1, except that the standpipe 26 and its column of water has been eliminated and a heat exchanger 40 has been substituted therefor to effect cooling of the engine cooling-liquid.

The heat exchanger 40 includes a copper heat exchange coil 41, one end 42 of which is adapted to be connected with the hose section 29 and the other end 43 of which is adapted to be connected with the hose section 32. A small expansion tank 44 is connected with the upper end 43 of the coil 41 to facilitate filling of the engine cooling system with raw water, antifreeze, or water containing a rust inhibitor, etc. A vented cap 45 normally closes the inlet opening of the tank 44 and provides for the escape of air or vapor to the atmosphere. The tank 44 accommodates expansion of the liquid in the system and the vented cap 45 avoids undue pressure on the water jacket of the engine and on the coil 41. A conventional drain valve 46 is connected with the lower end 42 of the coil 41 for draining said coil and engine, at will. A casing 47 encloses the heat exchange coil 41, and the valve 27 is connected with the lower end of said casing by a pipe 48, which serves as a supply pipe for preferably continually delivering cooling water to the heat exchanger 40. A pipe 49 connected with the upper end of the casing 47 serves to conduct the water from the heat exchanger 40 to a suitable drain. Thus, the casing 22 of the heat exchanger 21 for cooling the liquid of the dynamometer D is connected in series with the casing 47 of the heat exchanger 40 for cooling the liquid of the engine 1. The heat exchanger 40, like the heat exchanger 21, is arranged in counterflow relation, i. e., the cooling water flows in a direction opposite to that of the engine cooling-liquid for maximum cooling efficiency. The valve 27 may be disposed between the two heat exchangers 21 and 40, to control the volume of flow of cooling water to the heat exchanger 40 in accordance with the cooling requirements of the engine 1 to maintain a desired engine operating temperature.

Instead of positioning the valve 27 in the conduit means 24—48 so that it is disposed between the two heat exchangers 21 and 40, said heat exchangers can be interconnected by a conduit 24, as indicated in Fig. 3, and a valve 27ª, similar to the valve 27 can be connected with the pipe 49 at the discharge side of the heat exchanger 40, as also indicated in Fig. 3. The valve 27ª, arranged as specified, would be advantageous with certain types of heat exchangers because it would make it possible to maintain the heat exchanger cooling water under pressure. The arrangement shown in Fig. 3 makes it possible to maintain the cooling water in both heat exchangers 21 and 40 under pressure for the reason that said heat exchangers are interconnected for series flow.

The cooling systems shown in Figs. 2 and 3 have the advantage over that shown in Fig. 1 in that a high boiling point liquid, antifreeze, etc., can be used to effect cooling of the engine 1, without contamination or commingling of the continually flowing cooling water therewith.

The devices disclosed herein are, in effect, dual purpose, series cooling systems for cooling the brake liquid of a dynamometer and for cooling an engine being tested by the dynamometer. In contrast, it has been the practice heretofore for manufacturers and users of dynamometers, for testing internal combustion engines or other devices requiring water-cooling, to install the equipment with a so-called parallel cooling system. That is to say, water is taken from a source of supply to cool the dynamometer liquid and discharged to waste, and water is taken from the same source of supply, or other source, to cool the cooling liquid of the engine or apparatus being tested and discharged to waste. While this method is practical from a performance standpoint, it has the undesirable disadvantage of excessive water consumption, corrosion or "lining" of the heat dissipation surfaces, and, when automatic controls are used, requires a duplication of the temperature regulating devices. The first two disadvantages are particularly important in the many areas where water for domestic or industrial use is scarce, expensive, or has a high impurity content or contains a substantial quantity of latent precipitation materials.

The following illustrative examples of cooling water requirements will serve to establish the advantages of the present series flow cooling systems over prior parallel flow cooling systems. The horsepower and temperature values selected are not to be construed in any way as limitations upon the scope or use of the invention.

Both electric and hydraulic dynamometers dissipate heat during normal power absorption at the approximate rate of 42.5 B. t. u. per minute per horsepower absorbed. (One mechanical horsepower=42.5 B. t. u./min.) The average maximum city water temperature throughout the country is approximately 80° F. The highest practical water discharge temperature, after cooling the dynamometer apparatus with the purest of water, is usually considered to be 148° F.

Under these above conditions, solving of the Formula $a$, below, will indicate the quantity of water required to operate dynamometer equipment alone under abnormally good water conditions:

(a) $$\text{G. P. M.} = \frac{\text{B. t. u.}}{8.33 \times Td}$$

where:

G. P. M.=gallons per minute of cooling water.
B. t. u.=British thermal units to be absorbed.
$Td = t_2 - t_1$ =temperature differential between water inlet temperature ($t_1$) and outlet temperature ($t_2$).
8.33=constant for lbs. of water in one U. S. gallon.

Assuming 100 horsepower (H. P.) is to be absorbed by the dynamometer with 80° F. inlet water ($t_1$) and 148° F. outlet water temperature ($t_2$).

The heat load of the dynamometer=
$$42.5 \times 100 = 4250 \text{ B. t. u./min.}$$

G. P. M. required for cooling the dynamometer=$\frac{42.5 \times 100}{8.33(148-80)} = 7.5$ Hence, the gallons of cooling water required per horsepower per hour by the dynamometer=
$$\frac{60 (\text{min.}) \times 7.5 (\text{G. P. M.})}{100 (\text{H. P.})} = 4.5$$

Therefore, it is seen that even under ideal cooling conditions 4.5 gallons of water per horsepower per hour is the very minimum consumption rate of commercial dynamometers. This rate becomes staggering as the horsepower absorbed increases. For example:

100 H. P. at 4.5 G./H. P./hr.=450 gallons/hr.
500 H. P. at 4.5 G./H. P./hr.=2250 gallons/hr.
1000 H. P. at 4.5 G./H. P./hr.=4500 gallons/hr.

In cases where water of high impurity content is used, 130° F. water outlet temperature is often the maximum permissible with dynamometers to avoid harmful precipitation of the impurities. Substituting 130 for $t_2$ in Formula $a$:

$$\text{G. P. M.} = \frac{42.5 \times 100}{8.33(130-80)} = 10.2$$

Gallons of water consumption per horsepower per hour=$\frac{60 \times 10.2}{100} = 6.12$ Therefore, the water necessary to cool the dynamometer in many locations having water of a high impurity content is as follows:

100 H. P. at 6.12 G./H. P./hr.=612 gallons/hr.
500 H. P. at 6.12 G./H. P./hr.=3060 gallons/hr.
1000 H. P. at 6.12 G./H. P./hr.=6120 gallons/hr.

This water consumption for cooling the dynamometer alone is great and, of course, does not include the additional water required for cooling the internal combustion engine.

In determining this additional water requirement, the B. t. u./H. P./min. dissipated through the water jacket of the average internal combustion engine must be considered. This usually ranges from 21.25 for the most efficient to 85 for the less efficient. For the purpose of illustration, a typical automotive engine of 100 H. P. will be considered because of its popularity. These engines may be said to transfer an average of 65 B. t. u./H. P./min. to their water jackets. Assuming a normal outlet water temperature ($t_2$) of 170° F., Formula $a$ may be used to compute the water required for cooling such engines, it being understood that a 170° F. water outlet temperature may be successfully maintained for engines undergoing dynamometer tests with impure water since the total time the engine operates under the load imposed by the dynamometer is not sufficiently great to cause engine damage by water precipitation:

The heat load of the engine=65×100=6500 B. t. u./min.

$$G. P. M. = \frac{65 \times 100}{8.33 \times (178-80)} = 8.66$$

Then the total gallons of water required per hour=8.66×60=519.60.

Accordingly, for a dynamometer absorbing 100 H. P. developed by an automotive type engine in an installation having separate or parallel cooling systems for each, the following total water consumption requirements must be met:

Gallons/hr.
Under best water cooling conditions:
    Dynamometer requires_____ 450
    Engine requires_____ 519.6
                                       ------
        Total_____ 969.6

Under impure water cooling conditions:
    Dynamometer requires_____ 612
    Engine requires_____ 519.6
                                       ------
        Total_____ 1131.6

The advantages of the present series cooling system will be apparent from a comparison of the cooling water requirements thereof with those of a parallel system. Such comparison is made below, employing the same factors considered above in determining the water consumption in a parallel cooling system. Thus, in the series cooling system the comparable requirements are:

Heat load of the dynamometer = 42.5×100 = 4,250 B. t. u./min.
Heat load of the engine      = 65  ×100 = 6,500 B. t. u./min.

Total heat load                       = 10,750 B. t. u./min.

G. P. M. required for total cooling = $\frac{10,750}{8.33 \times (170-80)}$ = 14.35

G. P. H. required for total cooling = 14.35×60 = 861.00

The 861 gallons of cooling water required per hour for the series system is to be compared to the 969.6 gallons per hour required for the parallel system under ideal water conditions, and it will be apparent that there is a net saving of 108.6 gallons per hour in favor of the series system. However, since few installations are made in areas favored with ideal water conditions, the actual and practical economies in favor of the series flow system are better expressed by a comparison of the 861 G. P. H. required for the series system with the 1131.6 G. P. H. required for a parallel system with impure water, and this shows a net saving of 270.6 G. P. H. in favor of the series system.

Another advantage of a series cooling system over a parallel cooling system resides in the fact that the impurities in the cooling water need not be seriously considered, inasmuch as the temperature of the water leaving the dynamometer H and entering the pipe 24 is below that which would cause precipitation of the impurities. For example: In the case of the typical series installation described herein, the temperature of the water discharged from the dynamometer D can be readily determined by using Formula $a$ and solving for the temperature differential ($Td$) between the inlet and outlet temperatures of the water supplied to the heat exchanger 21:

$$Td = (t_2 - t_1) = \frac{B. t. u.}{8.33 \times G. P. M.}$$

or $$(t_2 - 80) = \frac{4250}{8.33 \times 14.35} = 35.5° \text{ F.}$$

$$t_2 = 35.5 + 80 = 115.5° \text{ F.}$$

The value of 115.5° F. for the outlet temperature of the cooling water from the dynamometer heat exchanger 21 is far below the commercial and military limits for even salt water cooled heat exchangers, so that precipitation with the use of average domestic water would be nil.

It thus becomes apparent that, from the standpoint of the life of the heat dissipation surfaces of the dynamometer, the series cooling system insures greater longevity as well as reduced total water consumption.

Another advantage of the series cooling system over a parallel cooling system for a dynamometer and engine is the elimination of one control valve for temperature regulation. In a parallel cooling system, a separate valve is required to control the volume of water for cooling the dynamometer and for cooling the engine. This item is of importance for the reason that often elaborate and expensive automatic valves are necessary.

From a study of the preceding temperature data, it is observed that a temperature balance is always maintained between the engine 1 and dynamometer H regardless of the heat dissipation requirements of the engine. While many dynamometers require close regulation of outlet water temperature, the closed circulating system for the liquid of the hydraulic dynamometer H does not require close temperature regulation. Hence, a valve is not necessary in the present series cooling system for effecting temperature regulation of the dynamometer H. Therefore, within the limitations of present commercial liquid-cooled engines, the only temperature control necessary for the series cooling system associated with the dynamometer H and the engine 1 is a valve such as the valve 27 used primarily for controlling the engine temperature and conserving water by avoiding waste of all water in excess of the actual cooling requirements of the engine.

It will be understood that various changes may be made in the details of construction and arrangement of the parts of the cooling systems disclosed herein without departing from the spirit of the invention or the scope of the annexed claims.

I claim:

1. A cooling system for a liquid-cooled power absorption device adapted to contain power absorption liquid, and a liquid-cooled prime mover driving said power absorption device and being tested by said power absorption device, comprising: a liquid-cooled heat exchanger arranged to effect cooling of the liquid of said power absorption device; means for supplying liquid-coolant to said heat exchanger; and means connected in series with said heat exchanger utilizing the coolant discharged from said heat exchanger for effecting cooling of the prime mover undergoing test.

2. A cooling system for a liquid-cooled power absorption device adapted to contain power absorption liquid, and a liquid-cooled prime mover driving said power absorption device and being tested by said power absorption device, comprising: a liquid-cooled heat exchanger arranged to effect cooling of the liquid of said power absorption device; means for supplying liquid-coolant to said heat exchanger; means connected in series with said heat exchanger utilizing the coolant discharged from said heat exchanger for effecting cooling of the prime mover undergoing test; and means controlling the volume of coolant delivered to said last-mentioned means in accordance with the cooling requirements of the prime mover.

3. A cooling system for a liquid-cooled power absorption device adapted to contain power absorption liquid, and a liquid-cooled prime mover driving said power absorption device and being tested by said power absorption device, comprising: a liquid-cooled heat exchanger arranged to effect cooling of the liquid of said power absorption device; means for supplying liquid-coolant to said heat exchanger; and means connected in series with said heat exchanger for conducting the coolant discharged from said heat exchanger to said prime mover for circulation thereof through said prime mover to effect cooling of said prime mover.

4. A cooling system for a liquid-cooled power absorption device adapted to contain power absorption liquid, and a liquid-cooled prime mover driving said power absorption device and being tested by said power absorption device, comprising: a liquid-cooled heat exchanger arranged to effect cooling of the liquid of said power absorption device; means for supplying liquid-coolant to said heat exchanger; means connected in series with said heat exchanger for conducting the coolant discharged from said heat exchanger to said prime mover for circulation through said prime mover to effect cooling of said prime mover; and means controlling the volume of coolant supplied to cool said prime mover in accordance with the cooling requirements of said prime mover.

5. A cooling system for a liquid-cooled power absorption device having an inlet and an outlet for power absorption liquid, and a water-cooled prime mover being tested by said power absorption device and having a coolant inlet and a coolant outlet, comprising: a heat exchanger including a casing having an inlet and an outlet and a coil within said casing having an inlet and an outlet adapted to be connected with the inlet and outlet of said power absorption device and arranged to cool the power absorption liquid of said power absorption device; a coolant supply conduit connected with said inlet of said casing for continually delivering a coolant thereto; a standpipe; a pipe connecting said outlet of said casing with the lower end of said standpipe for conducting the coolant from said casing to said standpipe, said standpipe having a discharge opening adapted to be connected with the coolant inlet of said prime mover, said standpipe also having a return opening located at a level above said discharge opening and adapted to be connected with the coolant outlet of said prime mover, said standpipe further having overflow means at a level above said return opening for continually draining heated and excess coolant from said standpipe; and a drain valve connected with said standpipe for draining the same when not in use.

6. A cooling system as defined in claim 5, wherein a valve is provided in the pipe interconnecting the outlet of the heat exchanger casing with the lower end of the standpipe for controlling the volume of coolant supplied to said standpipe in accordance with the cooling requirements of the prime mover.

7. In combination: a liquid-cooled power absorption device having an inlet and an outlet for power absorption liquid; a liquid-cooled prime mover having a coolant inlet and a coolant outlet; means operatively interconnecting said prime mover and said power absorption device so that said power absorption device can absorb the power developed by said prime mover; a heat exchanger including a casing having an inlet and an outlet, and a coil within said casing also having an inlet and an outlet; means connecting the inlet and outlet of said coil with the outlet and inlet, respectively, of said power absorption device so that the liquid of said power absorption device can circulate through said coil; a coolant supply conduit connected with the inlet of said casing for continually supplying coolant thereto; a standpipe; a pipe connecting the outlet of said casing with the lower end of said standpipe, said standpipe having a discharge opening; means connecting said discharge opening with the coolant inlet of said prime mover, said standpipe also having a return opening located at a level above said discharge opening; means connecting said return opening with the coolant outlet of said prime mover, said standpipe being further provided with an overflow opening at a level above said return opening for continually draining heated and excess coolant from said standpipe; and means controlling the volume of coolant discharged from said heat exchanger and delivered to said standpipe in accordance with the cooling requirements of said prime mover.

8. In combination: a hydraulic dynamometer adapted to contain power absorption liquid; a liquid-cooled engine having a coolant inlet and a coolant outlet; means operatively interconnecting said engine and said dynamometer so that said dynamometer can absorb the power being developed by said engine; a heat exchanger including a casing having an inlet and an outlet and a coil within said casing; means connecting said coil with said hydraulic dynamometer so that the power absorption liquid of said hydraulic dynamometer can circulate through said coil; a coolant supply conduit connected with the inlet of said casing for continually supplying coolant thereto; a standpipe; a pipe connecting the outlet of said casing with the lower end of said standpipe, said standpipe having a discharge opening; means connecting said discharge opening with the coolant inlet of said engine, said standpipe also having a return opening located at a level above said discharge opening; and means connecting said return opening with the coolant outlet of said engine, said standpipe being further provided with an overflow opening at a level above said return opening for continually draining heated and excess coolant from said standpipe.

9. In combination: a hydraulic dynamometer adapted to contain power absorption liquid; a liquid-cooled engine having a coolant inlet and a coolant outlet; means operatively interconnecting said engine and said dynamometer so that said dynamometer can absorb the power being developed by said engine; a heat exchanger including a casing having an inlet and an outlet and a coil within said casing; means connecting said coil with said hydraulic dynamometer so that the power absorption liquid of said hydraulic dynamometer can circulate through said coil; a coolant supply conduit connected with the inlet of said casing for continually supplying coolant thereto; a standpipe; a pipe connecting the outlet of said casing with the lower end of said standpipe, said standpipe having a discharge opening; means connecting said discharge opening with the coolant inlet of said engine, said standpipe also having a return opening located at a level above said discharge opening; means connecting said return opening with the coolant outlet of said engine, said standpipe being further provided with an overflow opening at a level above said return opening for continually draining heated and excess coolant from said standpipe; and means in said pipe between said heat exchanger and standpipe for controlling the volume of coolant supplied to said standpipe in accordance with the cooling requirements of the engine.

10. A cooling system for a liquid-cooled power absorption device adapted to contain brake liquid, and a liquid-cooled prime mover driving said power absorption device and being tested by said device, comprising: a first heat exchanger arranged to effect cooling of the brake liquid of said power absorption device; a second heat exchanger arranged to effect cooling of the cooling-liquid of said prime mover; means for continually initially introducing a coolant into said first heat exchanger; conduit means connecting said heat exchangers in series flow so that the coolant will first effect cooling of the liquid of said power absorption device, and upon discharge from said first heat exchanger will be conducted to said second heat exchanger for effecting cooling of the prime mover cooling-liquid; means connected in said conduit means for varying the volume of coolant delivered to said second heat exchanger in accordance with the cooling requirements of the prime mover; and means for discharging coolant from said second heat exchanger to waste.

11. A cooling system for a liquid-cooled power absorption device and a liquid-cooled prime mover driving said power absorption device and being tested by said device, comprising: a first heat exchanger arranged to effect cooling of the liquid of said power absorption device; a second heat exchanger arranged to effect cooling of the cooling-liquid of said prime mover; means for continually initially introducing a coolant into said first heat exchanger; conduit means connecting said heat exchangers in series flow so that the coolant will first effect cooling of the liquid of said power absorption device, and upon discharge from said first heat exchanger will be conducted to said second heat exchanger for effecting cooling of the prime mover cooling-liquid; means for discharging coolant from said second heat exchanger to waste; and means maintaining the coolant in said heat exchangers under pressure and varying the volume of flow of said coolant in accordance with the cooling requirements of said prime mover.

12. In engine testing apparatus: a hydraulic, liquid-cooled power absorption device adapted to be driven by a liquid-cooled prime mover having a coolant inlet and a coolant outlet; means for operatively interconnecting said prime mover and said power absorption device so that said power absorption device can absorb the power developed by said prime mover; means for varying the volume of brake liquid in said power absorption device to vary the load absorption capacity thereof; a heat exchanger including a casing having an inlet and an outlet and a coil within said casing; means connecting said coil with said power absorption device so that the brake liquid of said power absorption device can circulate through said coil; a coolant supply conduit connected with the inlet of said casing for continually supplying coolant thereto; means connecting the outlet of said casing in series with the coolant inlet of said prime mover; and means for connecting the coolant outlet of said prime mover to waste.

13. The combination claimed in claim 12, including means controlling the volume of coolant discharged from said heat exchanger and delivered to said prime mover in accordance with the cooling requirements of said prime mover.

14. A cooling system for a liquid-cooled power absorption device adapted to contain brake liquid, and a liquid-cooled prime mover driving said power absorption device and being tested by said device, comprising: a first heat exchanger arranged to effect cooling of the brake liquid of said power absorption device; a second heat exchanger arranged to effect cooling of the cooling-liquid of said prime mover; means for continually initially introducing a coolant into said first heat exchanger; conduit means connecting said heat exchangers in series flow so that the coolant will first effect cooling of the liquid of said power absorption device, and upon discharge from said first heat exchanger will be conducted to said second heat exchanger for effecting cooling of the prime mover cooling-liquid; and means for discharging coolant from said second heat exchanger to waste.

15. Means for testing a liquid-cooled prime mover having a cooling system, comprising: a power absorption unit; a cooling system for cooling said power absorption unit; means for drivingly inter-connecting said prime mover with said power absorption unit; a conduit for connecting said cooling systems in series for coolant flow from the colder to the hotter cooling system to provide for a maximum rise in coolant temperature to thereby reduce the quantity of coolant required to cool the power absorption unit and prime mover while said prime mover is driving said power absorption unit.

16. Means for testing a liquid-cooled prime mover having a cooling circuit, comprising: a liquid-cooled power absorption device for absorbing the power developed by said prime mover during a test, said power absorption device having a cooling circuit; means for first supplying a cooling liquid to the cooling circuit of said power absorption device to effect cooling of said power absorption device; means for connecting the cooling circuit of said power absorption device in series with the cooling circuit of said prime mover so that said prime mover is cooled by the cooling liquid discharged from the cooling circuit of said power absorption device; and means for controlling the volume of cooling liquid supplied to said prime mover from said power absorption device in accordance with the cooling requirements of said prime mover.

EDWIN L. CLINE.

REFERENCES CITED

The following references are of record in the file of this patent:

UNITED STATES PATENTS

| Number | Name | Date |
|---|---|---|
| 998,876 | Daimler | July 25, 1911 |
| 1,217,591 | Goldmerstein | Feb. 27, 1917 |
| 1,228,215 | Junkers | May 29, 1919 |
| 1,637,382 | Liepert | Aug. 2, 1927 |
| 1,915,547 | North et al. | June 27, 1933 |
| 2,185,491 | Anderson et al. | Jan. 2, 1940 |
| 2,188,172 | Brehob | Jan. 23, 1940 |
| 2,287,130 | Ramey | June 23, 1942 |
| 2,379,700 | Franck | July 3, 1945 |